United States Patent [19]

Nagamatsu et al.

[11] Patent Number: 5,438,647
[45] Date of Patent: Aug. 1, 1995

[54] MULTI-MANIPULATOR ROBOT APPARATUS

[75] Inventors: Shigetaka Nagamatsu, Aichi; Takao Miyatani, Toyota; Yisiaki Sugiura, Okazaki, all of Japan

[73] Assignee: Toyota Jidosha Kabushiki Kaisha, Toyota, Japan

[21] Appl. No.: 325,645

[22] Filed: Oct. 19, 1994

Related U.S. Application Data

[63] Continuation of Ser. No. 166,983, Dec. 15, 1993, which is a continuation of Ser. No. 865,272, Apr. 8, 1992, abandoned.

[30] Foreign Application Priority Data

Mar. 12, 1987 [GB] United Kingdom ............... 705892

[51] Int. Cl.⁶ .............................................. G06F 15/20
[52] U.S. Cl. .................................... 395/82; 395/80; 395/96; 395/97; 395/99
[58] Field of Search ................................ 395/80–83, 395/85–86, 89–90, 95–99, 901, 904, 912; 901/15

[56] References Cited

U.S. PATENT DOCUMENTS

| | | | |
|---|---|---|---|
| 4,620,831 | 11/1986 | Poncet et al. | 395/89 |
| 4,712,183 | 12/1987 | Shiroshita et al. | 395/97 |
| 4,799,170 | 1/1989 | Nakaya et al. | 395/93 |
| 4,890,241 | 12/1989 | Hoffman et al. | 395/90 |
| 4,908,559 | 3/1990 | Kurakake et al. | 395/96 |
| 4,984,175 | 1/1991 | Toyoda et al. | 395/96 |
| 4,989,161 | 1/1991 | Oaki | 395/96 |
| 4,990,838 | 2/1991 | Kawato et al. | 395/96 |
| 5,023,808 | 6/1991 | Seraji | 395/83 |
| 5,046,022 | 9/1991 | Conway et al. | 395/99 |
| 5,047,701 | 9/1991 | Takarada et al. | 395/99 |
| 5,265,195 | 11/1993 | Jinno et al. | 395/99 |

FOREIGN PATENT DOCUMENTS

| | | |
|---|---|---|
| 0073185 | 8/1982 | European Pat. Off. . |
| 0078113 | 10/1982 | European Pat. Off. . |
| 0233712 | 1/1987 | European Pat. Off. . |
| 63-295193 | 12/1988 | Japan . |
| 0781465 | 6/1955 | United Kingdom . |

OTHER PUBLICATIONS

R. M. H. Cheng, S. C. L. Poon, and T. Montor, "Adaptive Synchronization Control of a Robotic Manipulator Operating in an Intelligent Work Cell" IEEE Transactions on Industrial Electronics. Vol. 37, No. 2, Apr. 1990.

Material of Reliability and Maintenace Symposium–published Jun. 21, 1990.

Development of Multi–Arm Assembly Robot–published Jun. 7, 1990.

Development of Multi–Arm Assembly Robot–Toyota Technical Review vol. 4, No. 21 published Dec. 20, 1990.

Chang, SCL Poon and T. Montor, "Adapt Synchronization Control of A Robotic Manipulator . . . Workcell", IEEE Transactions on Industrial Electronics, vol. 37, No. 2, Apr. 1990.

Primary Examiner—Allen R. MacDonald
Assistant Examiner—Tariq Hafiz
Attorney, Agent, or Firm—Cushman, Darby & Cushman

[57] ABSTRACT

A robot apparatus is provided for supplying parts to a work conveyor line and assemblying the parts to a work conveyed along the conveyor line. The robot apparatus has a plurality of manipulators and a manipulator support for supporting the manipulators so that each manipulator is movable in a direction perpendicular to the work conveyor line and so that the manipulators protrude from the manipulator support in directions opposite to one another. The movable support of the manipulators enlarges the area accessible to the manipulators in the direction perpendicular to the conveyor line, and the opposite protrusion of the manipulators prevents interference of the manipulators.

6 Claims, 1 Drawing Sheet

MULTI-MANIPULATOR ROBOT APPARATUS

This is a continuation of application Ser. No. 08/166,983, filed on Dec. 15, 1993, which was abandoned upon the filing hereof which was a continuation of application Ser. No. 07/865,272 filed Apr. 8, 1992 now abandoned.

BACKGROUND OF THE INVENTION

1. Field of the Invention

The present invention relates to a robot apparatus having a plurality of arm and hand manipulator assemblies.

2. Description of the Prior Art

Japanese Patent Publication No. SHO 63-295193 discloses a double arm robot. The double arms of the robot are operated in harmony with each other by means of a control computer. That prior art robot has several deficiencies.

First, since the bases of the double arms of the prior art robot are fixed, the area which the arms can access is limited.

Second, when the parts supply area is located relatively far from the assembly area, the area which the robot arm must be capable of accessing must be large. As a result, the size of the robot must be great, which in turn increases the length of the work conveyor line along which the robot apparatuses are disposed.

Third, a complicated control of the arms with the computer is needed to avoid interference between the arms. Furthermore, once an interference occurs, the repair work is complex and takes a relatively long period of time.

SUMMARY OF THE INVENTION

An object of the invention is to provide a multi-manipulator robot apparatus which does not require that the length of a work conveyor line be increased the access area of the robot is increased and which is a simple structure which avoids interference between the manipulators.

The above-described object is realized, in accordance with the present invention, by providing a multi-manipulator robot apparatus wherein the manipulators can be shifted in a direction perpendicular to the conveyor line to retreive parts and wherein the manipulators project in opposite directions from their support. Thus, the robot apparatus preferably includes: a plurality of manipulators each having a table, an arm pivotably connected to the table, an arm case pivotably connected to the arm, an arm tube rotatably connected to the arm case, a wrist case pivotably connected to the arm case, and a flange as a hand rotatably connected to the wrist case; a manipulator support extending longitudinally in a direction perpendicular to the conveyor line and supporting the manipulators so that the tables of the manipulators are slidable along the manipulator support and protrude in opposite directions from each other in a conveyor line extending direction; a manipulator driving device for driving each manipulator along the manipulator support from one end portion of the manipulator support to another end portion of the manipulator support; and a robot controller electrically connected to each manipulator for operating each manipulator and the manipulator driving device in harmony with each other.

In the above-described robot apparatus, since the manipulators are moved along the manipulator support, the area which the manipulators can access is increased in a direction perpendicular to the conveyor line without enlarging the size of the robot in the direction in which the conveyor line extends and, thus, without increasing the length of the conveyor line. Further, since the manipulators extend in opposite directions from one another, the manipulators are unlikely to interfere with each other, without requiring a complicated control of the manipulators with a computer.

BRIEF DESCRIPTION OF THE DRAWING

The above and other objects, features, and advantages of the present invention will become more apparent and will be more readily appreciated from the following detailed description of the preferred embodiment of the invention taken in conjunction with the accompanying drawing, in which.

DETAILED DESCRIPTION OF THE PREFERRED EMBODIMENT

Figure 1:
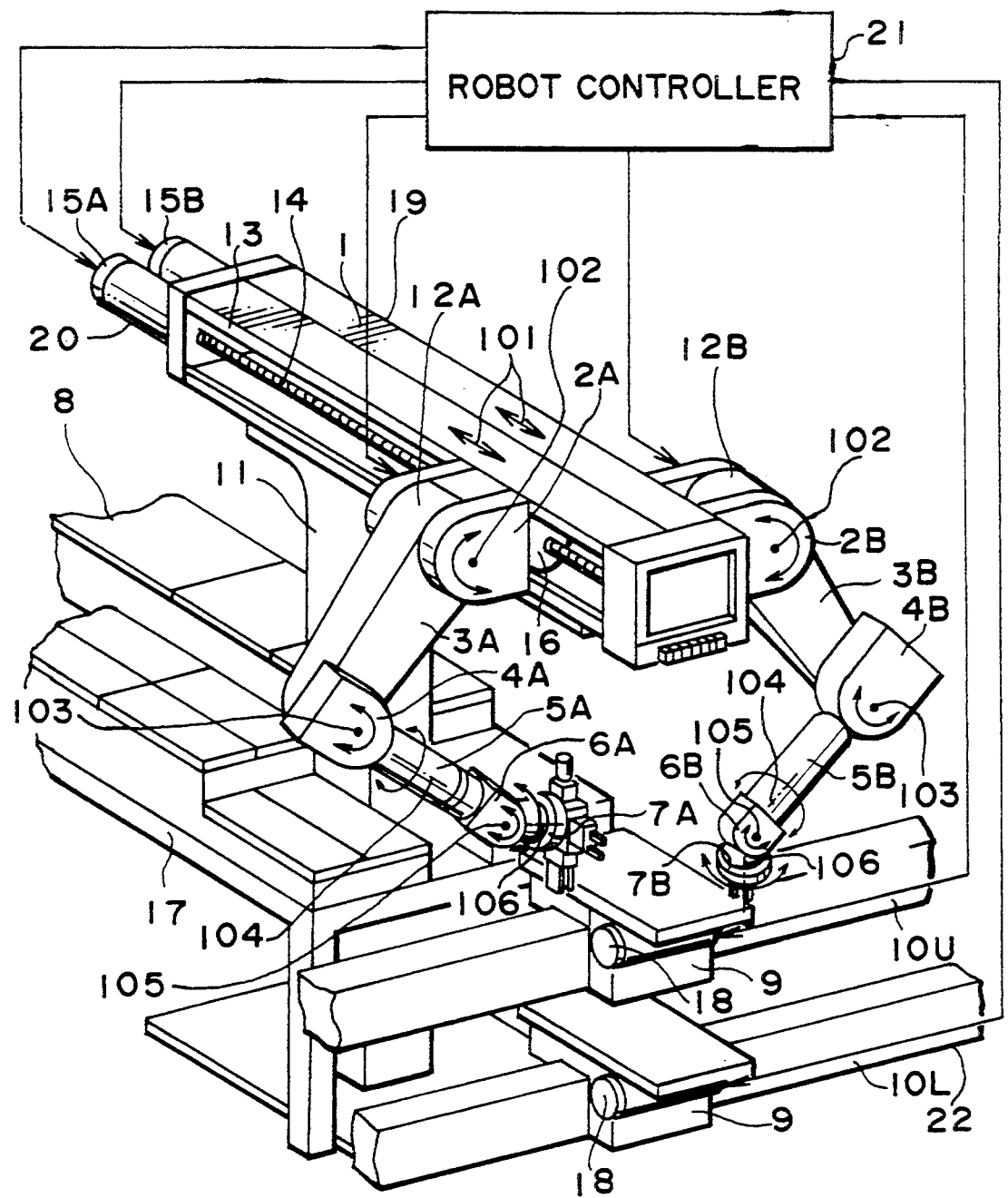
FIG. 1 is an oblique view of a multi-manipulator robot apparatus in accordance with one embodiment of the present invention.

As illustrated in FIG. 1, at least one multi-manipulator robot apparatus is provided to a work conveyor line 22 so that parts which are supplied by and handled by the robot apparatus are assembled into a work which is conveyed along the work conveyor line 22. FIG. 1 illustrates an exemplary multi-manipulator robot apparatus and a portion of the work conveyor line 22 in the vicinity of the multi-manipulator robot apparatus.

The multi-manipulator robot apparatus includes a plurality of manipulators in the form of arm and hand assemblies. In the illustrated embodiment, the robot includes two manipulators 12A and 12B, a manipulator support 19, a manipulator driving device 20, and a robot controller 21.

The manipulator support 19 extends longitudinally in a direction perpendicular to the axis of the work conveyor line 22. The manipulator support 19 includes a vertically extending fixed base 11 and a beam 1 which is fixed to the top of the base 11 with, for example, bolts. The beam extends horizontally in a direction perpendicular to the work conveyor line 19. The beam 1 has a guide 13 along which the manipulators 12A and 12B are slidably supported to move between a parts assembly area defined at or near one end of the manipulator support 19 and a parts supply area positioned at another end of the manipulator support 19. The parts are supplied to the robot apparatus at the parts supply area. Those parts are grasped by at least one of the manipulators 12A and 12B and are conveyed to the parts assembly area, where the parts are assembled or installed.

Each manipulator 12A, 12B is in the form of a multi-joint manipulator. Each manipulator 12A, 12B is moved by a manipulator driving device 20 along a first axis 101 extending in the direction perpendicular to the work conveyor line 22. More particularly, the manipulator moving device 20 has a plurality of screw rods 14 extending in the direction perpendicular to the work conveyor line 22. Ball screws 16 are engaged with the screw rods 14 and fixed to the manipulators 12A and 12B. Servomotors 15A and 15B rotate the screw rods 14 to drive the manipulators 12A and 12B, through engagement with the ball screws 16, between the opposite ends of the manipulator support 19.

Each manipulator 12A, 12B has six degrees of freedom, one of which is the above-noted straight movement along the first axis 101. The other five degrees of freedom are rotational movements at the rotatable joints of each manipulator 12A, 12B. Thus, robot apparatus having two manipulators 12A and 12B has twelve degrees of freedom.

More particularly, the first manipulator 12A has a table or shoulder element 2A, an arm 3A, an arm case 4A, an arm tube 5A, a wrist case 6A, and a flange or hand 7A. Similarly, the second manipulator 12B has a table or shoulder element 2B, an arm 3B, an arm case 4B, an arm tube 5B, a wrist case 6B, and a flange or hand 7B.

Each table 2A, 2B is guided by the guide 13 to move straight along the first axis 101. The manipulators 12A and 12B extend outwardly or protrude from the manipulator support 19 in opposite directions to each other. Thus, the first manipulator 12A approaches from one side of a part and the second manipulator 12B approaches from another side of the part. In this way, interference between the two manipulators 12A and 12B during movement from one end of the manipulator support 19 to the other is easily prevented.

Each arm 3A, 3B is pivotable about a second axis 102 which extends in parallel with the first axis 101 and is pivotably connected to each table 2A, 2B. Each table 2A, 2B is hollow. A servomotor (not shown) for pivoting each arm 3A, 3B and a reduction motor (not shown) are housed within each table 2A, 2B.

Each arm case 4A, 4B is rotatable about a third axis 103 which extends in parallel with and is offset from the second axis 102. Each arm case 4A and 4B is pivotably connected to a free end portion of each arm 3A, 3B. Each arm 3A, 3B is hollow to accommodate a servomotor (not shown) for rotating each arm case 4A, 4B and a reduction motor (not shown).

Each arm tube 5A, 5B is rotatably connected to each arm case 4A, 4B and rotatable about a fourth axis (axis of torsional rotation) 104 which extends perpendicular to the third axis 103. Each arm case 4A, 4B is hollow to accommodate a servomotor (not shown) for rotating each arm tube 5A, 5B and a reduction motor (not shown).

Each wrist case 6A, 6B is rotatably connected to each arm tube 5A, 5B so that it is rotatable about a fifth axis 105 which is perpendicular to the fourth axis 104. Each arm tube 5A, 5B is hollow to accommodate a servomotor (not shown) for rotating each wrist case 6A, 6B and a reduction motor (not shown).

Each flange or hand 7A, 7B is rotatably connected to a free end portion of each wrist case 6A, 6B so that it is rotatable about a six axis (torsional axis) 106 which is perpendicular to the fifth axis 105. Each wrist case 6A, 6B is hollow to accommodate a servomotor (not shown) for rotating each flange 7A, 7B and a reduction motor (not shown) are housed within each wrist case 6A, 6B. An attachment is detachably coupled to each flange 7A, 7B so that the flange and the attachment constitute a hand member of the robot and the attachment can be replaced by another attachment when the parts and work to be handled change.

The parts supply area which is located at one end of the manipulator support 19 is connected to a parts supply device such as a parts supply conveyor 17 or an automatic guidance vehicle (AGV) for supplying parts to the robot apparatus. A pallet 8 for mounting parts thereon may be used to convey the parts on the conveyor 17 to the parts supply area. The supplied parts are subsequently conveyed to the parts assembly area where the parts are assembled into a work.

Though only one robot apparatus is shown in FIG. 1, a plurality of multi-manipulator robot apparatuses are provided in parallel along the conveyor line 22, each extending in a direction perpendicular to the work conveyor line 22.

The work conveyor line 22 has an upper rail 10U and a lower rail 10L which are in parallel with each other. A conveyor table 9 on which a work is mounted is moved along the upper rail 10U and is stopped at each multi-manipulator robot apparatus so that a corresponding part can be assembled into the work. After all parts have been assembled into the work and the conveyor table 9 has reached an end of the upper rail 10U, the assembled work is taken from the conveyor table 9 to be sent to the next working station. The thus vacant conveyor table 9 is then shifted by a lifter (not shown) from the upper rail 10U to the lower rail 10L and is moved along the lower rail 10L so as to be returned to the opposite end of the lower rail 10L. At that point, the conveyor table 9 is shifted by another lifter (not shown) from the lower rail 10L to the upper rail 10U. This type of robot system is used, for example, in assembly of a vehicle differential device.

The conveyor table 9 shown in FIG. 1 has a motor 18 for driving the table 9. Alternatively, the conveyor table 9 may be driven by other drive mechanism such as a chain and sprocket drive mechanism. For positioning of the conveyor table 9 at each robot apparatus, a hole (not shown) opening toward the base 11 is formed in the work conveyor table 9 and a pin (not shown) is provided on the robot apparatus side. The pin is driven so as to be inserted into the hole to position the conveyor table 9 with respect to the robot apparatus.

The servomotors housed in the manipulators 12A and 12B are electrically connected to a robot controller 21 which includes a computer so that operation of the manipulators 12A and 12B is controlled by the robot controller 21. Each drive motor 15A, 15B and each motor 18 is electrically connected to the robot controller 21 so that operations of each manipulator 12A, 12B, the manipulator driving device 20, and the work conveyor line 22 are linked to each other to avoid interference between the manipulators 12A and 12B. Since an operational specification of the servomotor housed in each manipulator 12A and 12B changes in accordance with the type of work and parts handled, the control program stored in the robot controller 21 should be changed when the type of work and parts are changed.

Operation of the multi-manipulator robot apparatus will now be explained.

Parts are supplied by a parts feeder or an AGV to the parts supply area of each robot apparatus. At least one of the manipulators 12A and 12B is moved to the parts supply area to grasp the part(s) and then convey the part(s) to the parts assembly area of the robot apparatus. Since the manipulators 12A and 12B are moved along the beam 1 in a direction perpendicular to the work conveyor line 22, a range of access of the robot apparatus can be enlarged in that direction without enlarging the size of the robot apparatus in the direction of the conveyor line and without increasing the length of the work conveyor line 22.

Since the manipulators 12A and 12B extend outwardly from the manipulator support 19 in opposite directions from one another in a direction parallel to the conveyor line extending direction, it is unlikely that the manipulators 12A and 12B will interfere with each other while the manipulators 12A and 12B are moved along the beam 1.

The conveyor table 9 on which the work is mounted is conveyed along the upper rail 10U to the assembly area of each robot apparatus and is positioned through insertion of a respective pin into the hole in the table 9. Then, the part(s) conveyed by the at least one of the manipulators 12A and 12B to the parts assembly area is assembled into the work on the conveyor table 9 by the manipulators 12A and 12B. Since the manipulators 12A and 12B handle the parts and the work from opposite sides of the work, the manipulators 12A and 12B are not likely to interfere with each other during assembly of the parts into the work. Thus, complicated control with a computer is not necessary to prevent interference. Instead, the relatively simple configuration of oppositely projecting manipulators 12A and 12B accomplishes that end, so that the robot apparatus can be simplified in structure and control to shorten the duration of robot control.

Since each manipulator 12A, 12B has five rotate/pivot axes and one slidable axis, each hand 7A, 7B has nearly six degrees of freedom (not perfectly six degrees of freedom because the second and third axes 102 and 103 are parallel to each other). Therefore, each manipulator 12A, 12B can take almost any attitude to perform almost any type of assemblies.

Since the second and third axes 102 and 103 are parallel, each arm 3A, 3B and each arm tube 5A, 5B are moved only in a plane perpendicular to the beam 1 and do not swing in the beam extending direction. As a result, safe access to each manipulator 12A, 12B is possible during operation of the robot apparatus.

In accordance with the present invention, the following advantages are obtained.

First, since the manipulators 12A and 12B are moved in a direction perpendicular to the work conveyor line 22, the area which the robot apparatus can access is enlarged in that direction so that the supply of parts to the robot apparatus is easy and does not increase the length of the work conveyor line 22.

Second, the manipulators 12A and 12B protrude in opposite directions from one another, interference between the manipulators is easily avoided without complex computer control.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A multi-manipulator robot apparatus for assembling a part to a work conveyed along a conveyor line, the robot apparatus comprising:
   at least one manipulator, each having a shoulder element, an arm pivotally connected to the shoulder element, an arm case pivotally connected to the arm, an arm tube connected to the arm case, a wrist case connected to the arm tube, and a hand portion connected to the wrist case;
   a manipulator support extending longitudinally in a direction perpendicular to a longitudinal axis of the conveyor line and supporting the at least one manipulator so that said shoulder element of each said manipulator is slidable along the manipulator support and so that said arm extends in a plane perpendicular to said manipulator support, wherein the manipulator support defines a first axis extending in a horizontal direction perpendicular to the conveyor line and said shoulders element is movable along the first axis, wherein each manipulator has a second axis extending parallel to the first axis, said arm being pivotable about the second axis so as to swing in a vertical plane perpendicular to the first axis, and wherein each manipulator has a third axis extending parallel to the second axis, said arm case being pivotable about the third axis so as to swing in a vertical plane perpendicular to the first axis;
   a manipulator driving device for driving each said manipulator horizontally in a direction perpendicular to the conveyor line along the manipulator support from one end portion of the manipulator support to another end portion of the manipulator support; and
   a robot controller electrically connected to each said manipulator for operating each said manipulator and the manipulator driving device in harmony with each other.

2. A robot apparatus according to claim 1, wherein each manipulator has a fourth axis extending perpendicularly to the third axis, said arm tube being rotatable about the fourth axis.

3. A robot apparatus according to claim 2, wherein each manipulator has a fifth axis extending perpendicularly to the fourth axis, said wrist case being pivotable about the fifth axis.

4. A robot apparatus according to claim 3, wherein each manipulator has a sixth axis extending perpendicularly to the fifth axis, said hand portion being rotatable about the fifth axis.

5. A robot apparatus according to claim 1, wherein robot apparatus has two manipulators, each projecting from opposite longitudinal sides of said support.

6. A robot apparatus according to claim 5, wherein said manipulator driving device comprises a pair of screw rods threadably engaged with the shoulder elements of the two manipulators and two electric drive motors, each of said electric drive motors rotating one of the screw rods of said pair.

* * * * *

UNITED STATES PATENT AND TRADEMARK OFFICE
CERTIFICATE OF CORRECTION

PATENT NO.   :   5,438,647
DATED        :   August 1, 1995
INVENTOR(S)  :   NAGAMATSU et al It is certified that error appears in the above-identified patent and that said Letters Patent is hereby corrected as shown below:

On the title page: Item

[75]  Inventors:  "Yisiaki Sugiura" should be
                  --Yosiaki Sugiura--.

Signed and Sealed this

Twenty-eighth Day of May, 1996

BRUCE LEHMAN

*Attest:*

*Attesting Officer*    *Commissioner of Patents and Trademarks*